United States Patent
Charignon

(10) Patent No.: US 10,230,846 B2
(45) Date of Patent: Mar. 12, 2019

(54) SYSTEMS AND METHODS FOR INTERACTING WITH ANSWERING SYSTEMS

(71) Applicant: Facebook, Inc., Menlo Park, CA (US)

(72) Inventor: Laurent Gabriel Stephane Charignon, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 96 days.

(21) Appl. No.: 15/157,081

(22) Filed: May 17, 2016

(65) Prior Publication Data
US 2017/0339275 A1    Nov. 23, 2017

(51) Int. Cl.
| | |
|---|---|
| *H04M 3/527* | (2006.01) |
| *H04M 1/725* | (2006.01) |
| *G06F 3/0484* | (2013.01) |
| *G06F 3/0482* | (2013.01) |
| *G06F 3/16* | (2006.01) |

(52) U.S. Cl.
CPC .......... *H04M 3/527* (2013.01); *G06F 3/0482* (2013.01); *G06F 3/04842* (2013.01); *G06F 3/167* (2013.01); *H04M 1/72522* (2013.01); *H04M 2201/40* (2013.01); *H04M 2201/60* (2013.01); *H04Q 2213/13405* (2013.01)

(58) Field of Classification Search
CPC .... G06F 3/167; G06F 3/165; G06F 17/30038; H04M 3/527; H04M 3/5183
USPC ......... 348/14.08; 379/68, 88.1, 88.12, 88.14, 379/88.17, 88.18, 93.17, 93.25, 142.03, 379/201.01, 201.02, 265.09, 93.23, 88.05, 379/265.02; 455/411, 414.1, 417, 556.1, 455/415; 704/270.1; 705/51; 710/63; 715/765; 370/352; 701/420; 709/204
See application file for complete search history.

(56) References Cited

U.S. PATENT DOCUMENTS

| | | | |
|---|---|---|---|
| 5,740,240 A * | 4/1998 | Jolissaint ............... | H04M 3/51 379/265.02 |
| 5,873,032 A * | 2/1999 | Cox ........................ | H04M 3/42 455/417 |
| 6,748,068 B1 * | 6/2004 | Walsh ................... | H04M 1/663 379/142.01 |
| 6,760,410 B1 * | 7/2004 | Lee ........................ | G06F 3/0481 379/433.06 |
| 6,778,653 B1 * | 8/2004 | Kallas ..................... | H04M 3/36 379/201.02 |
| 7,634,067 B1 * | 12/2009 | Velarde ................... | H04M 1/56 370/463 |
| 8,000,454 B1 * | 8/2011 | Or-Bach ................ | G06Q 20/10 379/100.14 |
| 8,509,418 B1 * | 8/2013 | Chadha ............... | H04M 3/5166 379/265.09 |

(Continued)

*Primary Examiner* — Gerald Gauthier
(74) *Attorney, Agent, or Firm* — Sheppard Mullin Richter & Hampton LLP

(57) ABSTRACT

Systems, methods, and non-transitory computer-readable media can cause a voice communication between a computing device and an automated answering system to be established. A set of options that are available for selection through the automated answering system during the voice communication can be determined. The set of options can be provided for presentation on a display screen of the computing device, wherein at least some of the options in the set are labeled with information that visually describes the options.

20 Claims, 11 Drawing Sheets

(56) References Cited

U.S. PATENT DOCUMENTS

| | | | | |
|---|---|---|---|---|
| 8,548,135 B1* | 10/2013 | Lavian | | H04M 3/493 379/142.06 |
| 8,879,698 B1* | 11/2014 | Lavian | | H04M 1/64 379/88.18 |
| 8,879,703 B1* | 11/2014 | Lavian | | H04M 3/493 379/201.01 |
| 8,880,120 B1* | 11/2014 | Lavian | | H04M 3/493 455/556.1 |
| 9,191,511 B1* | 11/2015 | Somani | | H04M 3/5158 |
| 9,646,007 B2* | 5/2017 | Pereira | | G06F 17/30038 |
| 2003/0041032 A1* | 2/2003 | Ballin | | G06F 17/30902 705/51 |
| 2003/0074198 A1* | 4/2003 | Sussman | | G10L 15/22 704/270.1 |
| 2004/0264677 A1* | 12/2004 | Horvitz | | H04M 3/527 379/265.02 |
| 2005/0197767 A1* | 9/2005 | Nortrup | | G01C 21/3667 701/420 |
| 2006/0227945 A1* | 10/2006 | Runge | | H04M 3/5307 379/88.05 |
| 2007/0003026 A1* | 1/2007 | Hodge | | H04M 3/533 379/88.1 |
| 2008/0010604 A1* | 1/2008 | Suito | | G06Q 30/06 715/765 |
| 2008/0310398 A1* | 12/2008 | Jain | | G10L 25/78 370/352 |
| 2008/0320080 A1* | 12/2008 | Lee | | G10L 15/22 709/204 |
| 2009/0104898 A1* | 4/2009 | Harris | | H04M 1/663 455/415 |
| 2009/0154666 A1* | 6/2009 | Rios | | G06F 3/04895 379/88.18 |
| 2009/0203362 A1* | 8/2009 | Ure | | H04M 1/57 455/414.1 |
| 2010/0189228 A1* | 7/2010 | Seyfetdinov | | H04M 3/42 379/88.14 |
| 2011/0086614 A1* | 4/2011 | Brisebois | | H04K 3/42 455/411 |
| 2011/0225330 A1* | 9/2011 | Lavian | | H04M 1/72527 710/63 |
| 2012/0257002 A1* | 10/2012 | Stocker | | H04M 3/4931 348/14.08 |
| 2012/0295602 A1* | 11/2012 | Einbinder | | H04W 4/16 455/417 |
| 2013/0189963 A1* | 7/2013 | Epp | | H04M 1/64 455/414.1 |
| 2014/0126707 A1* | 5/2014 | Patel | | H04M 3/493 379/88.18 |
| 2014/0161237 A1* | 6/2014 | Tolksdorf | | H04M 3/493 379/68 |
| 2014/0179281 A1* | 6/2014 | Kim | | G06F 3/167 455/414.1 |
| 2015/0201081 A1* | 7/2015 | Hodge | | H04M 15/83 379/88.12 |
| 2017/0177298 A1* | 6/2017 | Hardee | | G06F 3/167 |
| 2017/0185375 A1* | 6/2017 | Martel | | G06F 3/167 |
| 2017/0199717 A1* | 7/2017 | Pierfelice | | G06F 3/165 |
| 2017/0339275 A1* | 11/2017 | Charignon | | H04M 3/527 |

* cited by examiner

SYSTEMS AND METHODS FOR INTERACTING WITH ANSWERING SYSTEMS

FIELD OF THE INVENTION

The present technology relates to the field of interacting with computing devices (or systems). More particularly, the present technology relates to techniques for interacting with automated answering systems.

BACKGROUND

Today, people often utilize computing devices (or systems) for a wide variety of purposes. Users can use their computing devices to, for example, interact with one another, create content, share information, and access information. In some instances, a user can access a software application running on a computing device to make and receive voice calls. In some instances, a voice call between a mobile device of the user and a computing device of an entity may be established by utilizing various technologies for delivering voice, or multimedia, communications over a network (e.g., the Internet), such as Voice over IP (VoIP), for example.

SUMMARY

Various embodiments of the present disclosure can include systems, methods, and non-transitory computer readable media configured to cause a voice communication between a computing device and an automated answering system to be established. A set of options that are available for selection through the automated answering system during the voice communication can be determined. The set of options can be provided for presentation on a display screen of the computing device, wherein at least some of the options in the set are labeled with information that visually describes the options.

In some embodiments, the systems, methods, and non-transitory computer readable media are configured to obtain information describing an automated menu used by the automated answering system and cause the set of options to be labeled based at least in part on the information.

In some embodiments, the systems, methods, and non-transitory computer readable media are configured to determine the set of options by analyzing audio being communicated by the automated answering system during the voice communication, wherein the audio is analyzed using one or more speech recognition techniques and cause the set of options to be labeled based at least in part on the audio analysis.

In some embodiments, the systems, methods, and non-transitory computer readable media are configured to determine that a user operating the computing device has selected one of the labeled options being presented through the display screen and determine a second set of options that are available for selection through the automated answering system based at least in part on the user selection.

In some embodiments, the systems, methods, and non-transitory computer readable media are configured to determine a mapping between the labeled option selected and a numerical key associated with the labeled option and provide information that references the numerical key to the automated answering system to communicate the user selection.

In some embodiments, the information comprises a dual-tone multi-frequency signaling (DTMF) tone that corresponds to the numerical key.

In some embodiments, an option is labeled with at least one of: text describing the option, an icon that represents the option, or an animation that corresponds to the option.

In some embodiments, the systems, methods, and non-transitory computer readable media are configured to provide information describing a path that describes options selected by the user while accessing the automated answering system.

In some embodiments, the systems, methods, and non-transitory computer readable media are configured to determine that a user operating the computing device has selected one of the labeled options, the selected option requesting information from the automated answering system, provide information to the automated answering system to communicate the selected option, determine information describing a response to the request from the automated answering system, and cause the information describing the response to be displayed visually on the display screen.

In some embodiments, the systems, methods, and non-transitory computer readable media are configured to determine that the automated answering system is requesting information from the user and cause a prompt for the requested information to be presented visually on the display screen, the prompt indicating a format in which the information is being requested.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
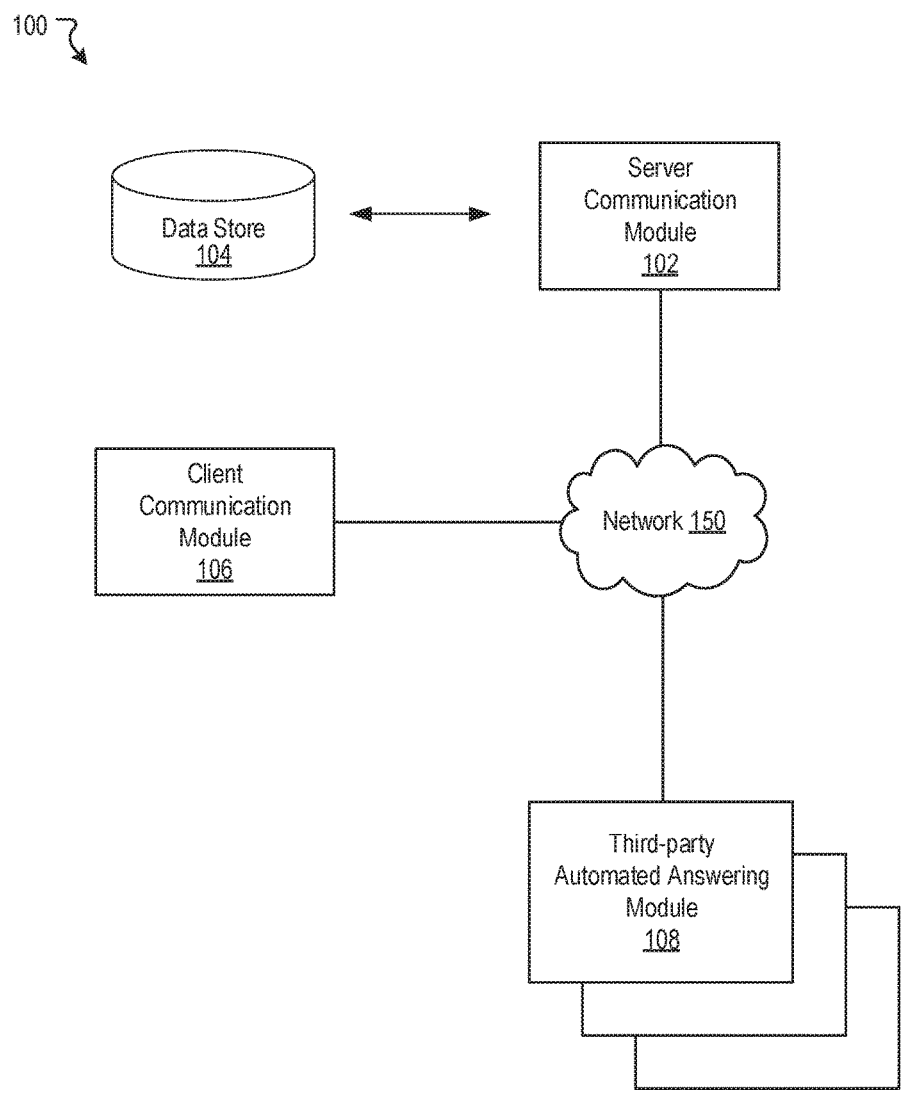
FIG. 1 illustrates an example system, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Interacting with Answering Systems

People use computing devices (or systems) for a wide variety of purposes. As mentioned, a user operating a computing device can initiate a voice call over a network using, for example, a software application running on the computing device. In some instances, when a user calls an entity, the call may be answered by an automated answering system (e.g., automated attendant, interactive voice response, etc.). In general, an automated answering system is configured to process voice calls using an automated menu (e.g., phone tree, telephony menu, automated attendant menu, interactive voice response menu, etc.) that provides callers with various options. Such options are typically communicated using pre-recorded audio by the automated answering system and may allow the user to route a call (e.g., "press 1 for sales, press 2 for customer support, or press 3 for all other inquiries") and/or query information (e.g., "press 1 to hear your checking account balance or press 2 to hear your savings account balance"), for example. The caller can select options, for example, by pressing the appropriate numerical key through a virtual keypad that is presented on a display screen of the user's computing device. The virtual keypad typically may include a corresponding numerical key for each digit in the 0-9 numerical range. In general, selecting a numerical key through the virtual keypad may cause a corresponding DTMF tone (dual-tone multi-frequency signaling), or some other appropriate signal, to be sent to the automated answering system. The automated answering system can determine the selected option based on the DTMF tone and can process the request accordingly. Such conventional approaches for automated answering systems can be sub-optimal for a number of reasons. For example, users typically need to wait for the automated answering system to audibly communicate the available options before being able to determine which option to select. This process is especially inefficient when there are many options that are available for selection and the user's desired option is repeated last (e.g., "press 1 to save this message, press 2 to forward this message, press 3 for envelope information, press 4 for archiving this message, press 5 for deleting this message"). Existing approaches can also be sub-optimal for users that are hearing impaired since such users may have difficulty hearing all of the options that are available. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, a communication system can be configured to establish voice communications, or calls, between the computing device of a user and a computing device of an entity (which may be answered by a representative of the entity and/or the entity's automated answering system). If the user's call is received by an automated answering system, the communication system can access any automated menus that are utilized by the automated answering system to determine which options are available to the user. The communication system can then provide information describing the various options that are available to the computing device of the user. In such embodiments, rather than displaying a virtual keypad on the display screen of the user's computing device, the options that are available for selection can be displayed visually instead. That is, the display screen can provide labeled options that are available to the user with respect to the automated menu (e.g., "(1) English" and "(2) Spanish"). Thus, instead of having to wait for the automated answering system to communicate the options and then selecting an appropriate numerical key, in such embodiments, the user can simply select a labeled option through the display screen.

FIG. 1 illustrates an example system 100, according to an embodiment of the present disclosure. As shown in the example of FIG. 1, the system 100 can include a server communication module 102, a client communication module 106, and a third-party automated answering module 108. In some instances, the example system 100 can include at least one data store 104. The components (e.g., modules, elements, etc.) shown in this figure and all figures herein are exemplary only, and other implementations may include additional, fewer, integrated, or different components. Some components may not be shown so as not to obscure relevant details.

In some embodiments, the server communication module 102, the client communication module 106, and/or the third-party automated answering module 108 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the server communication module 102, the client communication module 106, and/or the third-party automated answering module 108, can be implemented, in part or in whole, as software running on one or more computing devices or systems, such as on a user- or client computing device. For example, the server communication module 102 and/or the client communication module 106, in their entirety or at least a portion thereof, can be implemented as or within an application (e.g., app), a program, or an applet, etc., running on a user computing device or a client computing system, such as the user device 710 of FIG. 7. Further, the server communication module 102, or at least a portion thereof, can be implemented using one or more computing devices or systems that include one or more servers, such as network servers or cloud servers. In some instances, the server communication module 102 can, in part or in whole, be implemented within or configured to operate in conjunction with a social networking system (or service), such as the social networking system 730 of FIG. 7. Additionally, the third-party automated answering module 108, or at least a portion thereof, can be implemented using one or more computing devices or systems that include one or more servers, such as network servers or cloud servers. In some instances, the third-party automated answering module 108 can, in part or in whole, be implemented within or configured to operate in conjunction with a third-party system (or service), such as the external system 720 of FIG. 7.

Furthermore, in some embodiments, the server communication module 102 can be configured to communicate and/or operate with the at least one data store 104, as shown in the example system 100. The at least one data store 104 can be configured to store and maintain various types of data. In various embodiments, the at least one data store 104 can store content items (e.g., stories, images, links, electronic advertisements, etc.) that have been associated with at least one address (e.g., phone number, user id, email address, etc.) so that when such content items, or objects (e.g., buttons) associated with the content items, are selected, or clicked, the server communication module 102 can attempt to establish a voice communication with the third-party automated answering module 108 corresponding to that address. In some implementations, the at least one data store 104 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 104 can store information associated with users, such as user identifiers, user information, profile information, user specified settings, content produced or posted by users, and various other types of user data.

In various embodiments, the server communication module 102 can be configured to establish voice communications between the client communication module 106 (e.g., a user) and devices of other entities (e.g., users, organizations, etc.) over a network 150 (e.g., the Internet). In one example, the server communication module 102 can be configured to establish voice communications over the network 150 between the client communication module 106 and the third-party automated answering module 108 (e.g., an automated answering system) that corresponds to an entity.

The client communication module 106 may be configured to initiate a voice communication with the third-party automated answering module 108 in response to an address (e.g., phone number, user id, etc.) associated with the third-party automated answering module 108 being selected (e.g., dialed). For example, a user operating a computing device in which the client communication module 106 is implemented may initiate a voice communication with an entity (e.g., the third-party automated answering module 108) through a software application (e.g., a social networking application, a messenger application, etc.) running on the computing device. The user can interact with the software application to input, or select, the address that corresponds to the entity. The client communication module 106 may be also configured to initiate a voice communication with the third-party automated answering module 108 in response to a user selection of a content item and/or object (e.g., click-to-call button) associated with the address that corresponds to the third-party automated answering module 108. For example, a user operating a computing device in which the client communication module 106 is implemented may initiate a voice communication with an entity (e.g., the third-party automated answering module 108) by selecting an object (e.g., a click-to-call button for calling a customer service representative associated with the entity).

In various embodiments, the server communication module 102, the client communication module 106, and the third-party automated answering module 108 apply generally known techniques for establishing voice communications such as Voice over IP (VoIP), for example. Voice communications initiated by the client communication module 106 can be routed through the server communication module 102 to the appropriate entities (e.g., the third-party automated answering module 108). The third-party automated answering module 108 can be configured to answer, or service, any voice communications that are directed to its address. More details regarding the server communication module 102 will be provided below in reference to FIG. 2. More details regarding the client communication module 106 will be provided below in reference to FIG. 4.

Figure 2:
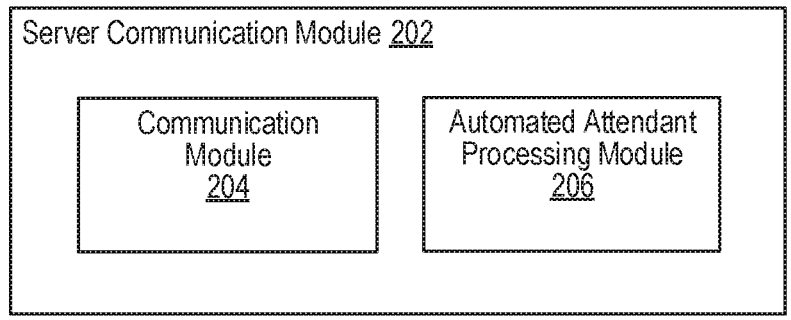
FIG. 2 illustrates an example server communication module, according to an embodiment of the present disclosure.

FIG. 2 illustrates an example server communication module 202, according to an embodiment of the present disclosure. In some embodiments, the server communication module 102 of FIG. 1 can be implemented with the server communication module 202. As shown in the example of FIG. 2, the server communication module 202 can include a communication module 204 and an automated attendant processing module 206.

The communication module 204 can be configured to utilize various technologies for receiving and/or delivering voice, or multimedia, communications over a network (e.g., the Internet), such as Voice over IP (VoIP), for example. When a user operating a computing device uses a software application to initiate a voice communication to an entity through the server communication module 202, the communication module 204 can establish the voice communication using an address associated with the entity. In some instances, the address used to establish the voice communication may be a phone number, a Uniform Resource Locator (URL), an e-mail address, user id, or some other address for routing traffic in a network, such as an Internet Protocol (IP) address. In some embodiments, the software application used to initiate the voice communication utilizes the client communication module 106 of FIG. 1, which is configured to interact with the server communication module 202.

In various embodiments, when the user's voice communication to the entity is received by an automated answering system (e.g., automated attendant, interactive voice response, etc.), the automated attendant processing module 206 can determine what options are available to the user based on any automated menus associated with the automated answering system. As mentioned, such options are typically associated with a respective numerical key and the user can input a numerical key through the user's computing device to select a corresponding option. In some embodiments, the automated attendant processing module 206 can label the available options and provide information describing the labeled options to the computing device of the user. In such embodiments, the software application running on the user's computing device can display the labeled options on the display screen of the user's computing device. For example, the display screen can present a first option "(1) Speak with Sales Representative" and a second option "(2) Speak with Tech Support", and such labeled options can be selected through the display screen, for example, by performing a gesture (e.g., touch gesture). More details regarding the automated attendant processing module 206 will be provided below in reference to FIG. 3.

Figure 3:
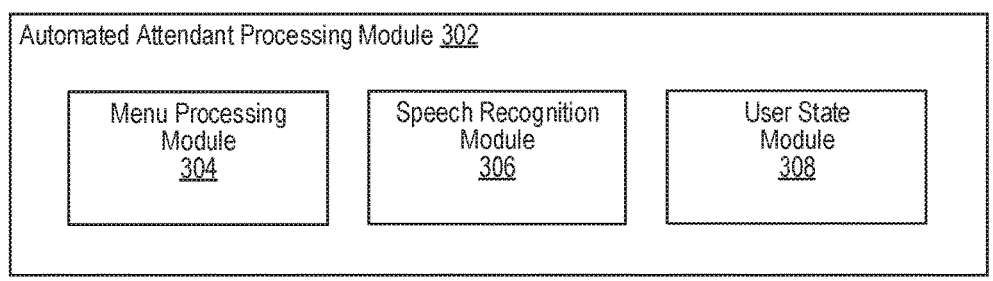
FIG. 3 illustrates an example automated attendant processing module, according to an embodiment of the present disclosure.

FIG. 3 illustrates an example automated attendant processing module 302, according to an embodiment of the present disclosure. In some embodiments, the automated attendant processing module 206 of FIG. 2 can be implemented with the automated attendant processing module 302. As shown in the example of FIG. 3, the automated attendant processing module 302 can include a menu processing module 304, a speech recognition module 306, and a user state module 308.

In various embodiments, when a user's voice call to an entity is received by an automated answering system, the automated attendant processing module 302 can automatically label any options that are available for selection and can provide these labeled options for display on the user's computing device.

In some instances, the automated attendant processing module 302 may have access to information describing an automated menu that is used by an entity's automated answering system. For example, a copy of the automated menu may be obtained in the form of a text file or some structured format (e.g., XML). In such instances, the menu processing module 304 can be configured to parse the automated menu to label any options that are available in various states of the automated menu. For example, the automated menu may indicate that the following options are available when a voice call is first established: "press 1 for English" or "press 2 for Spanish". In this example, the menu processing module 304 can associate "English" with the numerical option 1 and "Spanish" with the numerical option 2. Once a user selects one of these options, the user's state changes accordingly and another set of options can be presented. For example, if the user selected the English language option, the options available may be as follows: "press 1 for Sales", "press 2 for Customer Service", or "press 3 for Tech Support". In this example, the menu processing module 304 can associate "Sales" with the numerical option 1, "Customer Service" with the numerical option 2, and "Tech Support" with the numerical option 3. In some instances, the automated menu may instruct the automated answering system to request information from the user. For example, after the user selects the "Customer Service" option, the automated menu may request the last four digits of the user's social security number. In such instances, the menu processing module 304 can determine when user input will be requested, what type of information is requested (e.g., social security number, phone number, birthdate, etc.), and the format in which such information is requested (e.g., input birthday as MM DD YY).

After analyzing the automated menu, the menu processing module 304 is able to determine which options are available as well as what input will be requested as a user traverses the different states of the automated menu. Thus, when a user's voice call is routed to the automated answering system, for example, by the server communication module 202 of FIG. 2, the automated attendant processing module 302 can provide a set of labeled options that are available for selection to the user's computing device. A software application running on the user's computing device can present the set of labeled options on the display screen of the user's computing device. In some embodiments, once the user's state changes, for example, upon the user selecting a labeled option through the display screen, the automated attendant processing module 302 can provide another set of labeled options that are available to the user while in the new state. In some embodiments, the automated attendant processing module 302 provides all labeled options and information describing the states in which those options are available to the user's computing device. In such embodiments, the computing device automatically updates the display screen to reflect which options are available for selection as the user selects options. More details describing the presentation of labeled options will be provided below in reference to FIGS. 5A-D.

In some instances, information describing an entity's automated menu may not be available in advance. In such instances, when a user's voice call is routed to the automated answering system, for example, by the server communication module 202 of FIG. 2, the speech recognition module 306 can be configured to analyze any audio being communicated by the automated answering system to determine what options are available. The speech recognition module 306 can utilize any generally known technique for performing speech recognition including Hidden Markov Models, neural networks, deep feedforward neural networks, to name some examples. As a result, the speech recognition module 306 can generate information describing the automated menu being used by the entity's automated answering system, as described above, without requiring such information in advance.

The automated menu may also include options for accessing various information. For example, the user may be able to request information such as an account balance, whether a bill was processed, or available appointment times. Such information is typically provided by the automated answering system when requested. In various embodiments, the speech recognition module 306 analyzes any audio being communicated by the automated answering system in response to a query to determine the information being provided. For example, the speech recognition module 306 can apply techniques to convert the speech to text so that such information can be provided for display to the user's computing device.

The user state module 308 can be configured to track the user's state as the user navigates the automated menu. As mentioned, different options may be available depending on the state. For example, a first option and a second option may be available when the user is first connected to the automated answering system. A different set of options may be available to the user based on the user's selected option. For example, a third set of options may be available if the user selects the first option and a fourth set of options may be available if the user selects the second option. The user state module 308, therefore, maintains the user's current state so that the appropriate set of labeled options can be presented on the display screen of the user's computing device.

Figure 4:
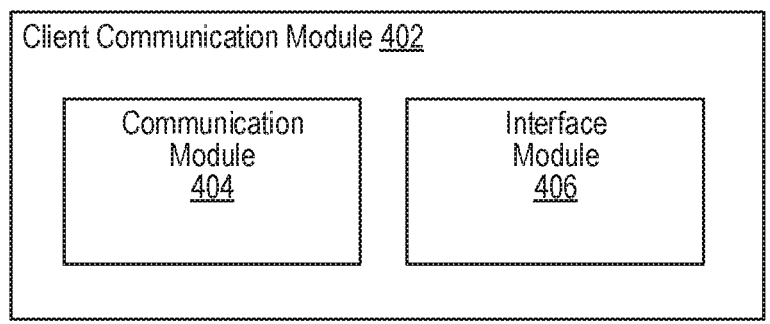
FIG. 4 illustrates an example client communication module, according to an embodiment of the present disclosure.

FIG. 4 illustrates an example client communication module 402, according to an embodiment of the present disclosure. In some embodiments, the client communication module 106 of FIG. 1 can be implemented with the client communication module 402. As shown in the example of FIG. 4, the client communication module 402 can include a communication module 404 and an interface module 406.

The communication module 404 can be configured to utilize various technologies for receiving and/or delivering voice, or multimedia, communications over a network (e.g., the Internet), such as Voice over IP (VoIP), for example. In some embodiments, when a user operating a computing device uses a software application to initiate a voice communication to an entity, the communication module 404 can initiate the voice communication through the server communication module 202 of FIG. 2. In such embodiments, the server communication module 202 can then connect to an address associated with the entity to establish the voice communication. In some embodiments, the communication module 404 can establish the voice communication with the entity directly using an address associated with the entity. In some instances, the address used to establish the voice communication may be a phone number, a Uniform Resource Locator (URL), an e-mail address, user id, or some other address for routing traffic in a network, such as an Internet Protocol (IP) address.

In various embodiments, the interface module 406 is configured to provide options and/or information relating to automated answering systems for presentation on a display screen of a computing device. Such information may be obtained, or received, from the server communication module 202 of FIG. 2, for example, during a voice communication that is established between the user computing device and the automated answering system, as described above. Some examples of the options and/or information that may displayed are provided below in reference to FIGS. 5A-D.

Figure 5A:
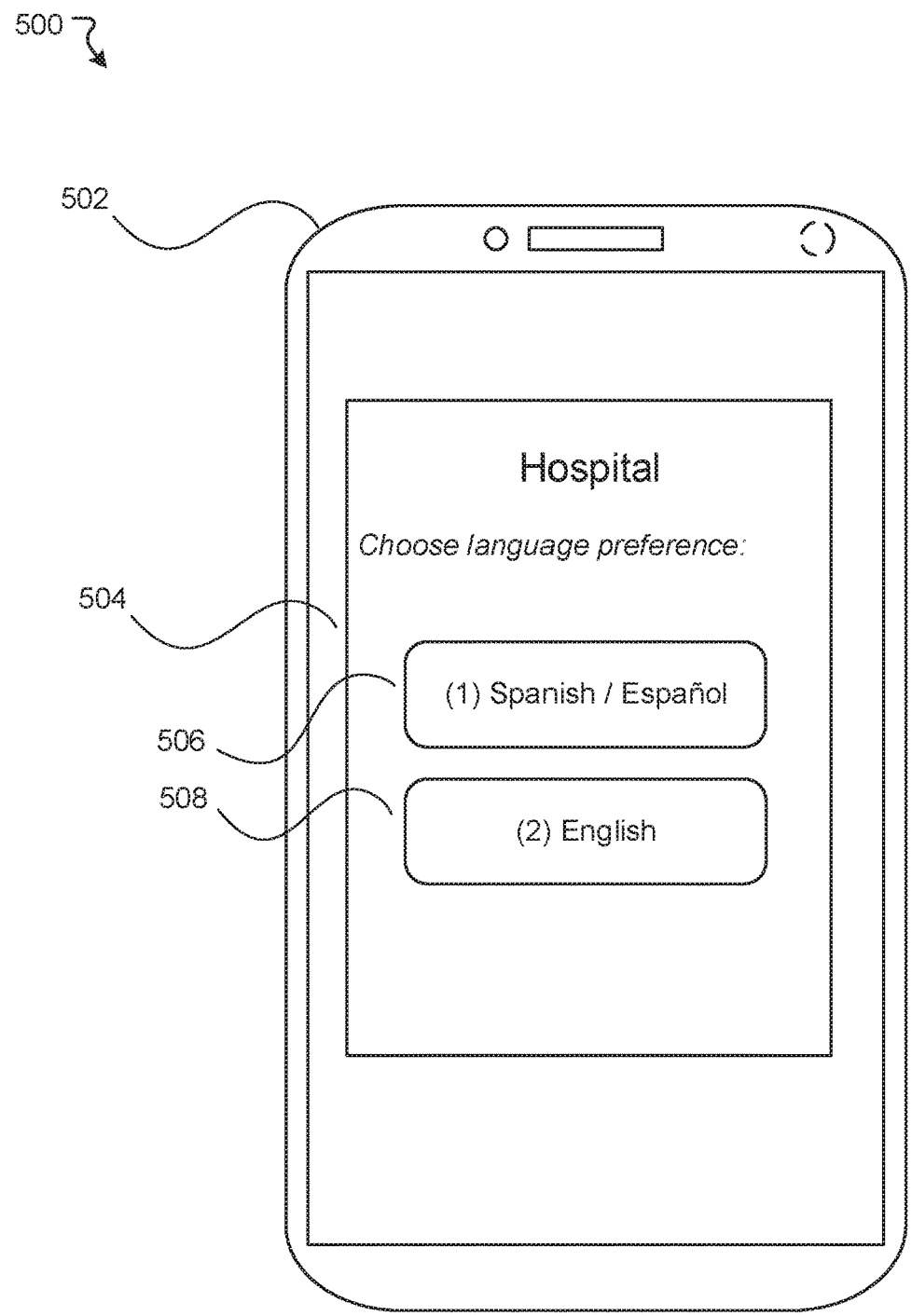
FIGS. 5A-D illustrate example interfaces for interacting with an automated answering system, according to an embodiment of the present disclosure.

FIG. 5A illustrates an example 500 of an interface 504 for interacting with an automated answering system, according to an embodiment of the present disclosure. The interface 504 is presented through a display screen of the computing device 502. Further, the interface 504 may be provided through an application (e.g., a web browser, a social networking application, messenger application, etc.) running on the computing device 502. In the example of FIG. 5A, a connection has been established between the computing device 502 and an automated answering system of an entity (e.g., "hospital"). The connection may be established through a communication system such as a social networking system (e.g., the social networking system 730 of FIG. 7), for example.

In this example, upon establishing the connection, the automated answering system may provide the user with a language preference. As mentioned, under conventional approaches, the automated answering system would typically communicate pre-recorded audio that conveys what options are currently available for selection (e.g., "press 1 for Spanish or 2 for English"). In various embodiments, the approaches described herein allow for such options to be labeled with information (e.g., text, icons, animations, etc.) that describes the respective option. The labeled options 506 and 508 can then be presented visually through a display screen of the computing device 502 as shown. In some embodiments, any audio being communicated from the automated answering system is muted and the user is only provided the labeled options 506 and 508 visually. In some embodiments, any audio being communicated from the automated answering system is permitted to be played to the user in addition to the labeled options 506 and 508 being provided visually.

The user operating the computing device 502 may select one of the labeled options 506 or 508 to view additional options. For example, the user may select the labeled option 508 to set English as their preferred language. In some embodiments, a labeled option may be selected in response to the user performing a gesture (e.g., touch gesture) in relation to the labeled option. When the labeled option 508 is selected, the computing device 502 can communicate information describing the selection to the social networking system through which the connection to the automated answering system is being routed. In some embodiments, the social networking system translates the user's selected option into a numerical key that corresponds to the selected option. For example, the automated answering system may have been programmed to interpret a DTMF tone that corresponds to the number 1 as a selection for "Spanish" and a DTMF tone that corresponds to the number 2 as a selection for "English". In the example of FIG. 5A, when the user selects the labeled option 508, the social networking system can be configured to map the labeled option 508 to a numerical key that is recognized by the automated answering system. The social networking system can then provide the appropriate numerical key to the automated answering system to indicate the user's selection. In some embodiments, such mapping of labeled options to numerical keys is done by the computing device 502. The mapping of labeled options to numerical keys is provided as one example. Naturally, labeled options may be mapped to any appropriate type of signal that is recognized by an automated answering system.

Figure 5B:
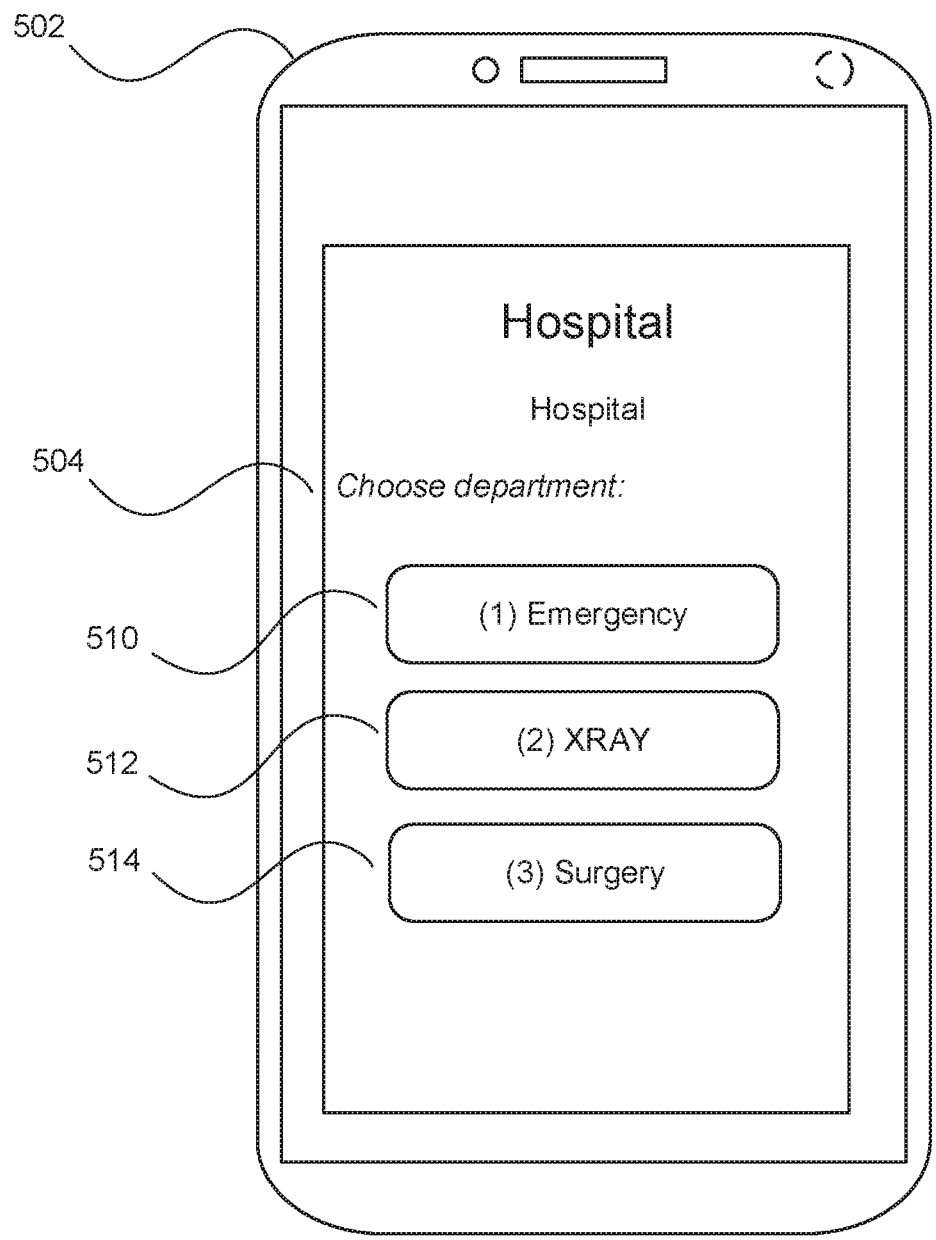
Figure 5C:
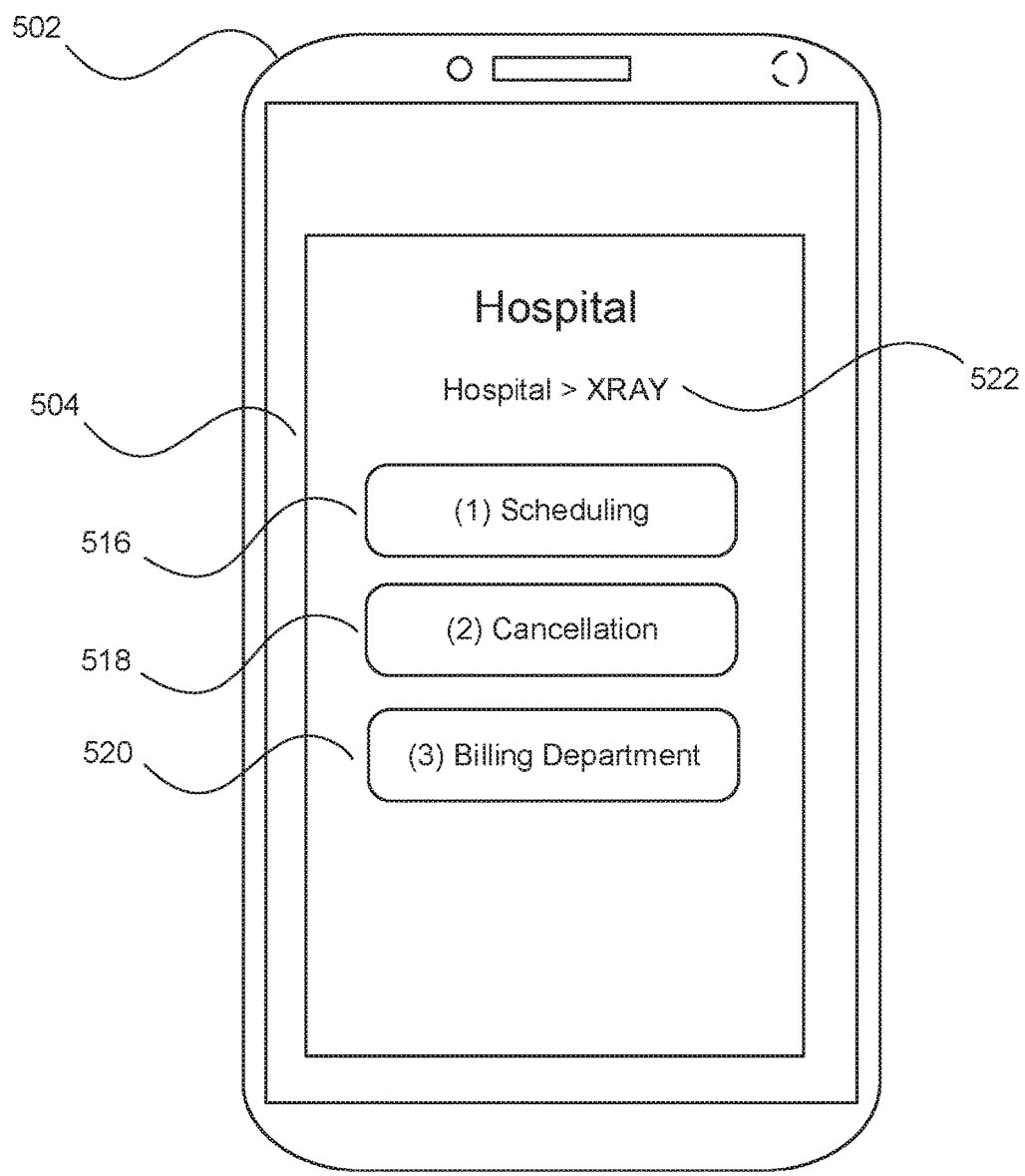

After selecting the labeled option 508, the automated answering system may provide the user with another set of options as illustrated in the example of FIG. 5B. In the example of FIG. 5B, the computing device 502 is shown as presenting another set of labeled options 510, 512, and 514. The user can select one of these options to have the call routed to a desired department. In this example, the user may select the labeled option 512 to be transferred to the XRAY department. As shown in the example of FIG. 5C, a new set of options that are available to the user may be determined and provided as labeled options 516, 518, and 520 through the display screen of the computing device 502. In some embodiments, a path 522 is shown on the display screen. This path 522 can be used to represent the user's state while accessing the automated answering system. In some embodiments, the user can interact with the path 522 to modify the user's state with respect to the automated menu. For example, the user may perform a gesture (e.g., touch gesture) on a region of the display screen that corresponds to the text "hospital" in the path 522 to return to the previous state. As a result, the user can be presented the set of labeled options 510, 512, and 512 as illustrated in the example of FIG. 5B.

Figure 5D:
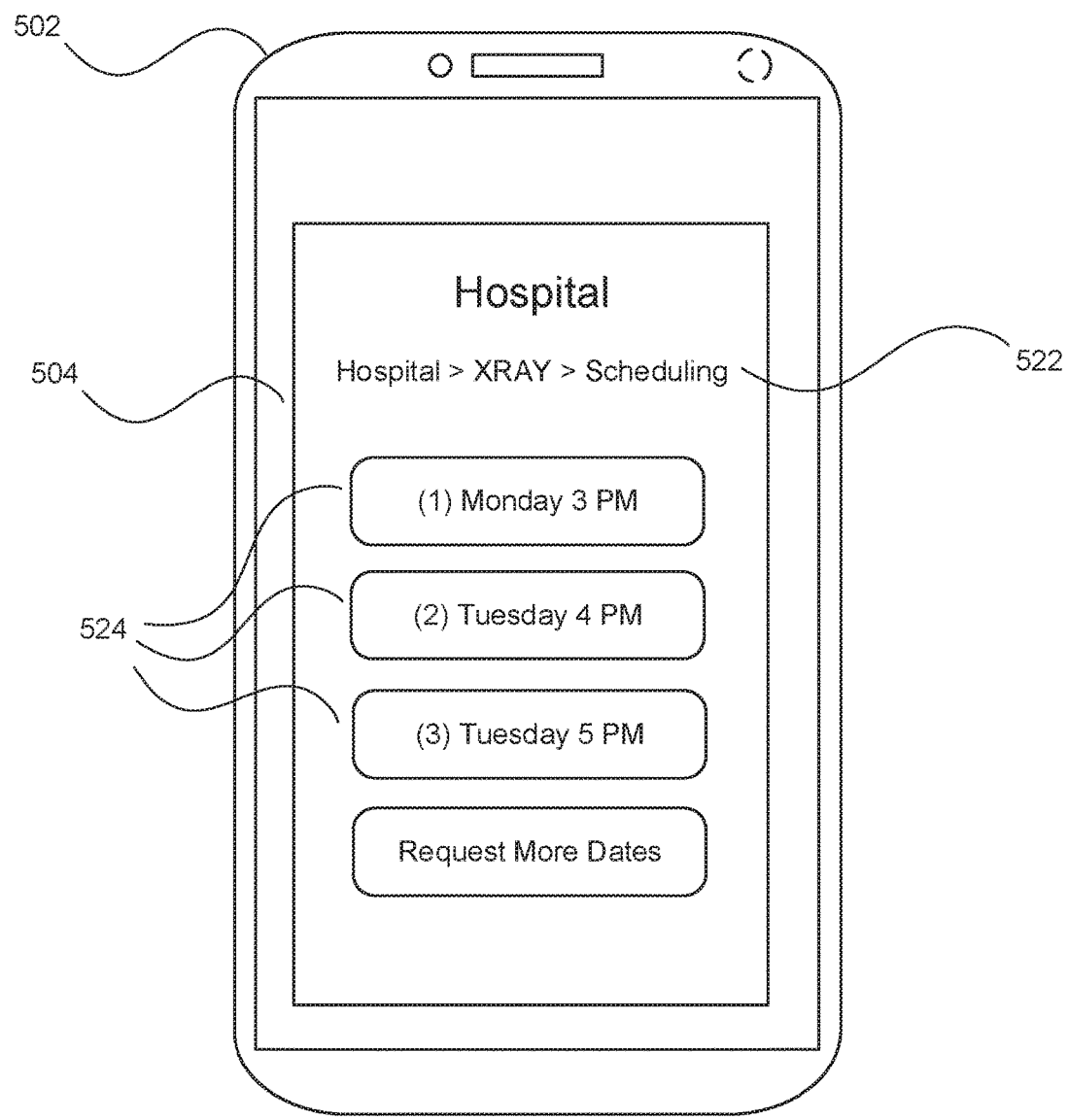

In the example of FIG. 5C, the user selects the labeled option 516 to schedule an appointment. The user is then presented with a set of available appointment times as shown in FIG. 5D. As mentioned, computing device 502 and/or the social networking system through which the call is being routed may send queries to the automated answering system for information. Any replies in response to the queries from the automated answering system can be labeled and presented, as described above. In the example of FIG. 5D, the user can select one of the labeled options 524 to schedule an appointment. In FIG. 5D, the path 522 has also been updated to reflect the user's current state. The user can interact with the path 522 to return to any of the previous states (e.g., "Hospital" or "XRAY"), as described above. In various embodiments, the automated answering system may request various information from the user. For example, the user may be asked to input the last four digits of their social security number. In this example, the display screen of the computing device 502 can be updated to indicate the type of information being requested and a virtual keypad may be presented on the display screen through which the user can input the requested information.

In some embodiments, rather than presenting labeled options, a virtual keypad may be presented on the display screen of the computing device 502 through which the user can select numerical keys to access various options. In such embodiments, the numerical keys in the virtual keypad that correspond to available options can be indicated as being selectable while numerical keys that correspond to options that are not presently available can be indicated as not being selectable. For example, if only options that correspond to the numerical keys 1 and 2 are available, then the remaining numerical keys 3-9 may appear as being grayed out. In some instances, there may be more options that are available for selection than there are numerical keys that can be assigned to the options. For example, a menu may have 12 available options in a given state. In such instances, an automated answering system may provide the user with up to nine options and then ask the user to press a numerical key (e.g., '0') to hear additional options. In some embodiments, all options that are available in a given state can be presented visually through the display screen at the same time. For example, the computing device 502 may determine that 12 options are available for selection. These options can then be labeled and presented visually through the display screen on the same interface (or page). In some embodiments, such options can be paginated. For example, the user can be presented the first nine options on the display screen and the user can select a "more" (or "next") button to view the remaining options. While viewing the remaining options, the user can be provided with a "previous" button to again view the previous nine options.

Figure 6:
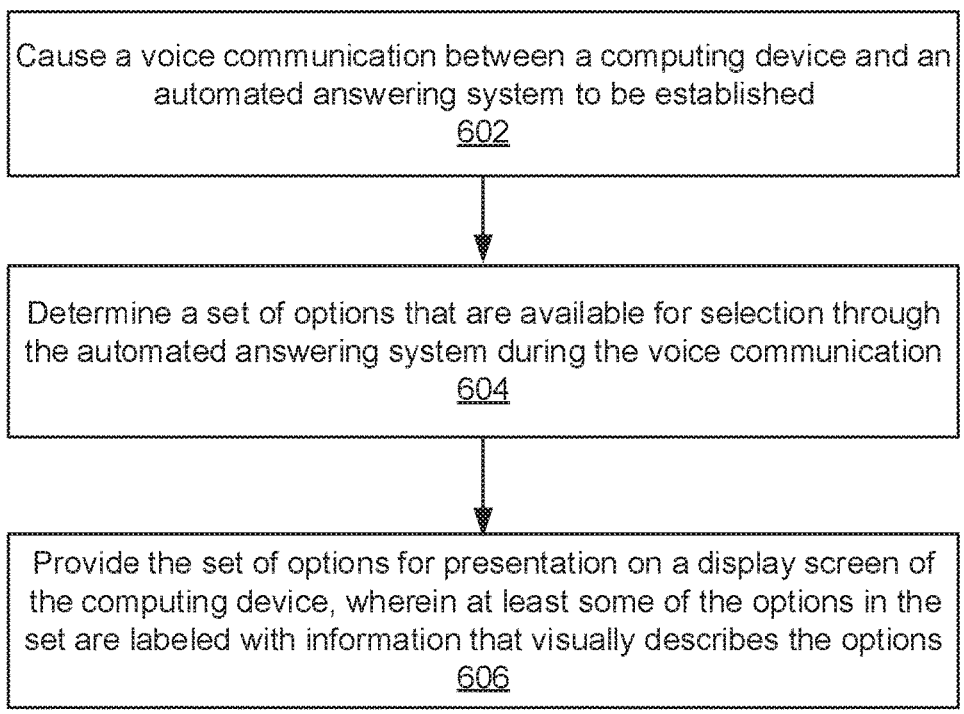
FIG. 6 illustrates an example process for interacting with an automated answering system, according to an embodiment of the present disclosure.

FIG. 6 illustrates an example process 600 for interacting with an automated answering system, according to an embodiment of the present disclosure. It should be appreciated that there can be additional, fewer, or alternative steps performed in similar or alternative orders, or in parallel, within the scope of the various embodiments discussed herein unless otherwise stated.

At block 602, the example method 600 can cause a voice communication between a computing device and an automated answering system to be established. At block 604, a set of options that are available for selection through the automated answering system during the voice communication can be determined. At block 606, the set of options can be provided for presentation on a display screen of the computing device, wherein at least some of the options in the set are labeled with information that visually describes the options.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
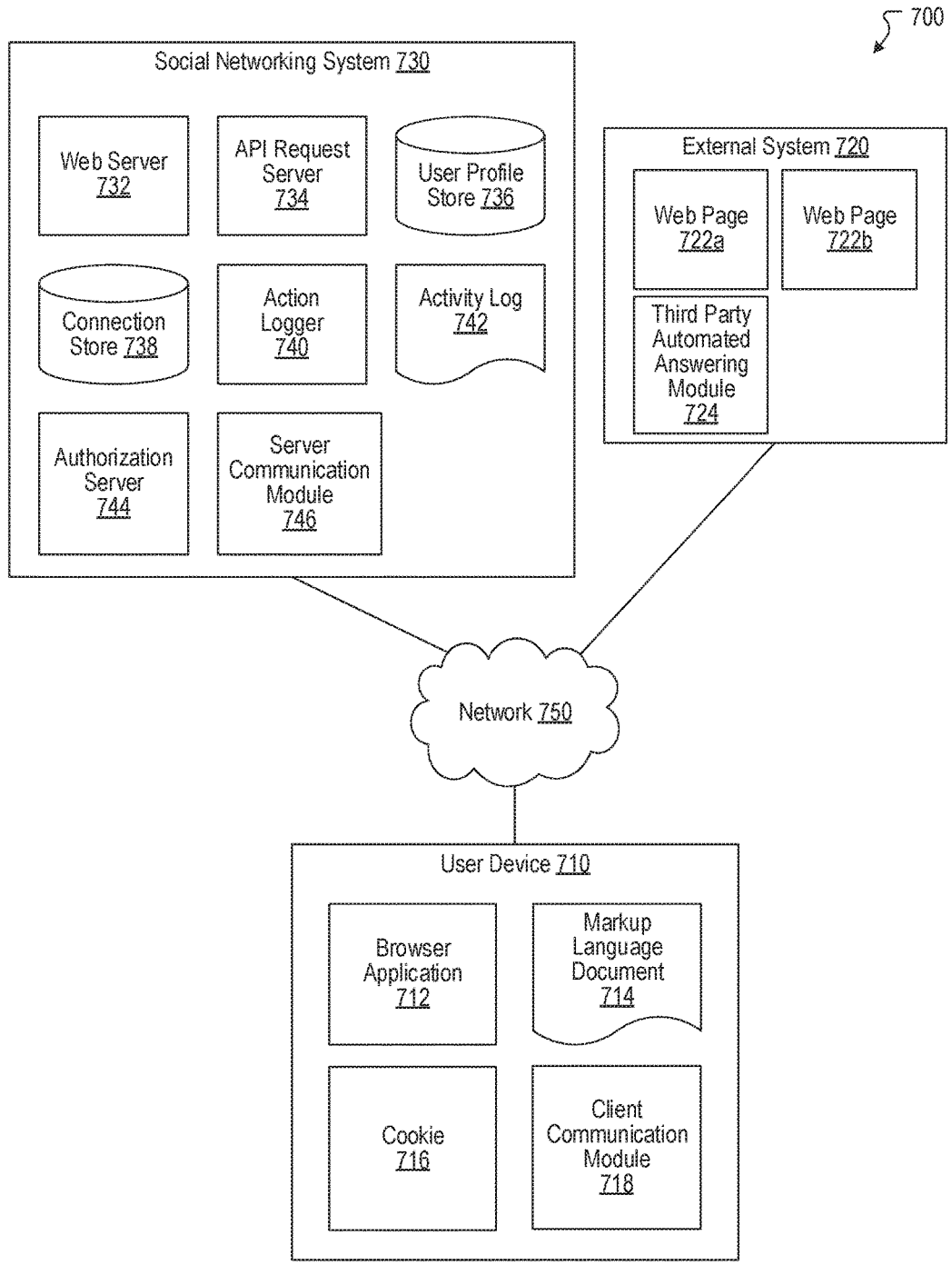
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content. As discussed previously, it should be appreciated that there can be many variations or other possibilities.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722*a* within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the user device 710 can include a client module 718. The client module 718 can, for example, be implemented as the client communication module 106 of FIG. 1. In some embodiments, the social networking system 730 can include server communication module 746. The server communication module 746 can, for example, be implemented as the server communication module 102 of FIG. 1. In some embodiments, the user device 710 can include a client communication module 718. The client communication module 718 can, for example, be implemented as the client communication module 106 of FIG. 1. In some embodiments, the external system 720 can include a third-party automated answering module 724. The third-party automated answering module 724 can, for example, be implemented as the third-party automated answering module 108 of FIG. 1. As discussed previously, it should be appreciated that there can be many variations or other possibilities.

Hardware Implementation

Figure 8:
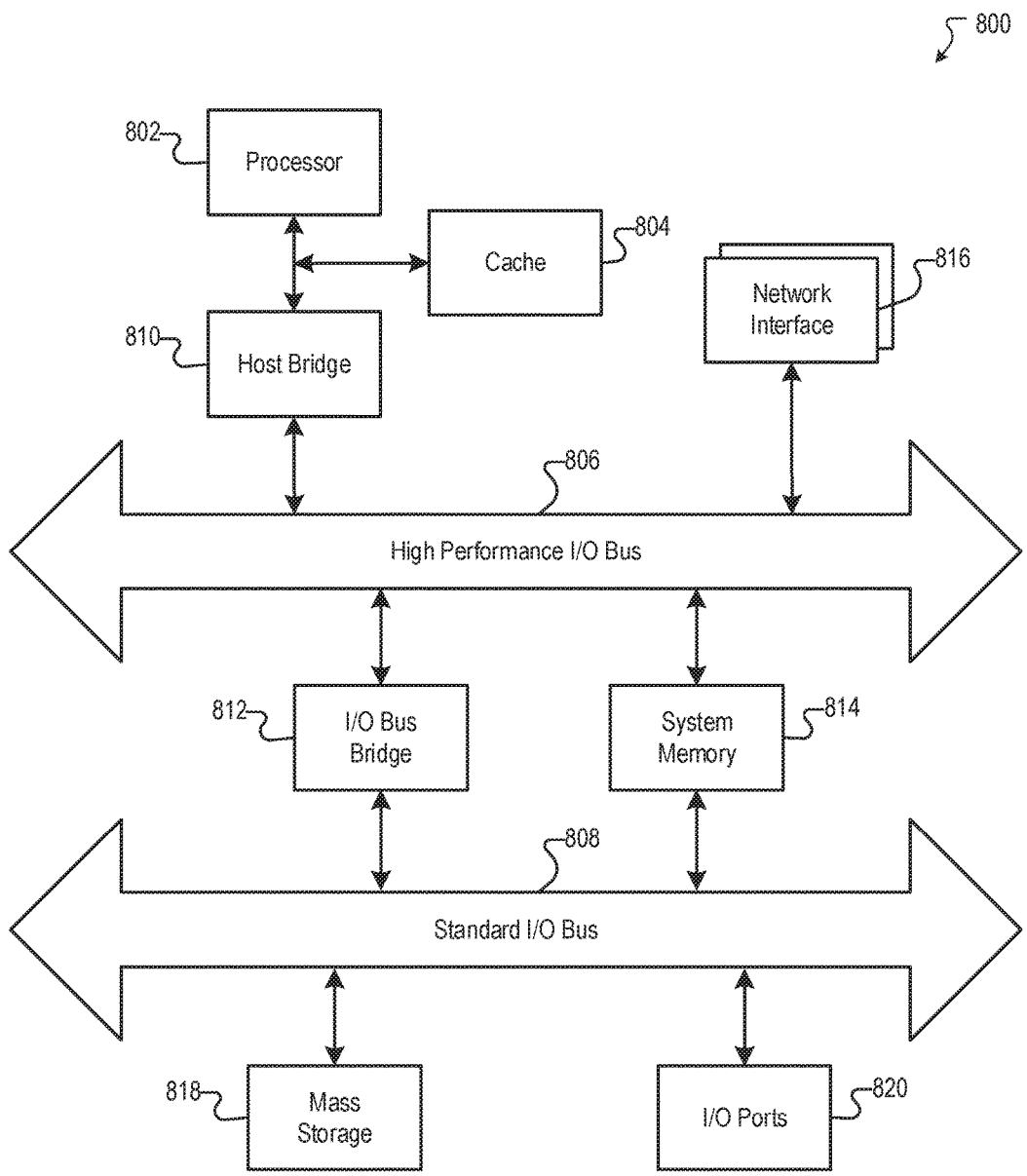
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs));

other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   causing, by a computing device, a voice communication between the computing device and an automated answering system to be established;
   analyzing, by the computing device, audio being communicated by the automated answering system during the voice communication;
   determining, by the computing device, an automated menu of the automated answering system based on the audio being communicated by the automated answering system; and
   providing, by the computing device, a set of options for presentation on a display screen of the computing device, wherein the set of options corresponds to the automated menu of the automated answering system.

2. The computer-implemented method of claim 1, wherein determining the automated menu of the automated answering system further comprises:
   accessing, by the computing device, information describing the automated menu of the automated answering system.

3. The computer-implemented method of claim 1, wherein the audio is analyzed using one or more speech recognition techniques.

4. The computer-implemented method of claim 1, the method further comprising:
   determining, by the computing device, that a user operating the computing device has selected one of the options being presented through the display screen; and
   determining, by the computing device, a second set of options that are available for selection through the automated answering system based at least in part on the user selection.

5. The computer-implemented method of claim 4, the method further comprising:
   determining, by the computing device, a mapping between the option selected and a numerical key associated with the option; and
   providing, by the computing device, information that references the numerical key to the automated answering system to communicate the user selection.

6. The computer-implemented method of claim 5, wherein the information comprises a dual-tone multi-frequency signaling (DTMF) tone that corresponds to the numerical key.

7. The computer-implemented method of claim 1, wherein an option is labeled with at least one of: text describing the option, an icon that represents the option, or an animation that corresponds to the option.

8. The computer-implemented method of claim 1, wherein providing the set of options for presentation on the display screen further comprises:
   providing, by the computing device, information describing a path that references options selected by the user while accessing the automated answering system.

9. The computer-implemented method of claim 1, the method further comprising:
   determining, by the computing device, that a user operating the computing device has selected one of the options, the selected option requesting information from the automated answering system;
   providing, by the computing device, information to the automated answering system to communicate the selected option;
   determining, by the computing device, information describing a response to the request from the automated answering system; and
   causing, by the computing device, the information describing the response to be displayed visually on the display screen.

10. The computer-implemented method of claim 1, the method further comprising:
    determining, by the computing device, that the automated answering system is requesting information from the user; and
    causing, by the computing device, a prompt for the requested information to be presented visually on the display screen, the prompt indicating a format in which the information is being requested.

11. A system comprising:
    at least one processor; and
    a memory storing instructions that, when executed by the at least one processor, cause the system to perform:

causing a voice communication between the computing device and an automated answering system to be established;

analyzing audio being communicated by the automated answering system during the voice communication;

determining an automated menu of the automated answering system based on the audio being communicated by the automated answering system; and providing a set of options for presentation on a display screen of the computing device, wherein the set of options corresponds to the automated menu of the automated answering system.

12. The system of claim 11, wherein determining the automated menu of the automated answering system further causes the system to perform:

accessing information describing the automated menu of the automated answering system.

13. The system of claim 11, wherein the audio is analyzed using one or more speech recognition techniques.

14. The system of claim 11, wherein the system further performs:

determining that a user operating the computing device has selected one of the options being presented through the display screen; and determining a second set of options that are available for selection through the automated answering system based at least in part on the user selection.

15. The system of claim 14, wherein the system further performs:

determining a mapping between the option selected and a numerical key associated with the option; and providing information that references the numerical key to the automated answering system to communicate the user selection.

16. A non-transitory computer-readable storage medium including instructions that, when executed by at least one processor of a computing system, cause the computing system to perform:

causing a voice communication between the computing device and an automated answering system to be established;

analyzing audio being communicated by the automated answering system during the voice communication;

determining an automated menu of the automated answering system based on the audio being communicated by the automated answering system; and providing a set of options for presentation on a display screen of the computing device, wherein the set of options corresponds to the automated menu of the automated answering system.

17. The non-transitory computer-readable storage medium of claim 16, wherein determining the automated menu of the automated answering system further causes the computing system to perform:

accessing information describing the automated menu of the automated answering system.

18. The non-transitory computer-readable storage medium of claim 16, wherein the audio is analyzed using one or more speech recognition techniques.

19. The non-transitory computer-readable storage medium of claim 16, wherein the computing system further performs:

determining that a user operating the computing device has selected one of the options being presented through the display screen; and determining a second set of options that are available for selection through the automated answering system based at least in part on the user selection.

20. The non-transitory computer-readable storage medium of claim 19, wherein the computing system further performs:

determining a mapping between the option selected and a numerical key associated with the option; and providing information that references the numerical key to the automated answering system to communicate the user selection.

* * * * *